United States Patent
Iwase

(10) Patent No.: US 9,338,325 B2
(45) Date of Patent: May 10, 2016

(54) IMAGE FORMING APPARATUS ISSUING A NOTIFICATION TO A NETWORK-CONNECTED TERMINAL IN RESPONSE TO OCCURRENCE OF AN EVENT, IMAGE FORMING APPARATUS MANAGEMENT AND CONTROL METHOD, AND NON-TRANSITORY COMPUTER-READABLE RECORDING MEDIUM STORING IMAGE FORMING APPARATUS CONTROL PROGRAM

(71) Applicant: KONICA MINOLTA, INC., Chiyoda-ku, Tokyo (JP)

(72) Inventor: Tomohiro Iwase, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 14/588,024

(22) Filed: Dec. 31, 2014

(65) Prior Publication Data
US 2015/0201094 A1   Jul. 16, 2015

(30) Foreign Application Priority Data
Jan. 10, 2014   (JP) ................................. 2014-002914

(51) Int. Cl.
| G06F 15/00 | (2006.01) |
| G06F 3/12 | (2006.01) |
| G06K 1/00 | (2006.01) |
| H04N 1/41 | (2006.01) |
| H04N 1/00 | (2006.01) |
| H04N 1/32 | (2006.01) |

(52) U.S. Cl.
CPC .................. *H04N 1/41* (2013.01); *G06F 3/121* (2013.01); *G06F 3/1234* (2013.01); *G06F 3/1259* (2013.01); *G06F 3/1285* (2013.01); *H04N 1/00233* (2013.01); *H04N 1/00344* (2013.01); *H04N 1/32635* (2013.01); *H04N 1/32662* (2013.01); *H04N 2201/0013* (2013.01)

(58) Field of Classification Search
USPC ................................................... 358/1.1–1.18
See application file for complete search history.

(56) References Cited

U.S. PATENT DOCUMENTS

| 9,030,701 | B2 * | 5/2015 | Amiya | ............... H04N 1/00233 358/1.15 |
| 2013/0003115 | A1 * | 1/2013 | Uchikawa | ............. G06F 3/1207 358/1.15 |

FOREIGN PATENT DOCUMENTS

| JP | 2004234650 A | 8/2004 |
| JP | 2005018607 A | 1/2005 |
| JP | 2006087058 A | 3/2006 |
| JP | 2012119003 A | 6/2012 |

OTHER PUBLICATIONS

Japanese Office Action (and English translation thereof) dated Oct. 28, 2015, issued in counterpart Japanese Application No. 2014-002914.

* cited by examiner

*Primary Examiner* — Douglas Tran
(74) *Attorney, Agent, or Firm* — Holtz, Holtz & Volek PC

(57) ABSTRACT

An image forming apparatus includes an image forming unit that forms an image on a sheet based on image data, an operation display unit for operation and display, a communication unit that performs communication via a network, and a control unit that manages and controls the apparatus, and, if a predetermined event has occurred at the apparatus, the control unit makes an information terminal apparatus connected to the network activate a remote panel for the image forming apparatus.

17 Claims, 7 Drawing Sheets

PROCESS EXAMPLE
- ACTIVATON OF THE REMOTE PANEL
- ACTIVATION OF MANAGEMENT APPLICATION
- ACTIVATION OF CAMERA APPLICATION
  (SUCH AS CONFIRMATION OF A STATE OF JAM)
etc

IMAGE FORMING APPARATUS ISSUING A NOTIFICATION TO A NETWORK-CONNECTED TERMINAL IN RESPONSE TO OCCURRENCE OF AN EVENT, IMAGE FORMING APPARATUS MANAGEMENT AND CONTROL METHOD, AND NON-TRANSITORY COMPUTER-READABLE RECORDING MEDIUM STORING IMAGE FORMING APPARATUS CONTROL PROGRAM

CROSS-REFERENCE TO RELATED APPLICATIONS

The present application claims priority under 35 U.S.C. §119 to Japanese Patent Application No. 2014-002914, filed Jan. 10, 2014. The contents of this application are incorporated herein by reference in their entirety.

BACKGROUND OF THE INVENTION

1. Field of the Invention

The present invention relates to an image forming apparatus, an information terminal apparatus, an image forming system, an image forming apparatus management and control method, a computer-readable recording medium storing an image forming apparatus control program and a computer-readable recording medium storing an information terminal apparatus control program, which enable remote display or/and operation of the image forming apparatus using the information terminal apparatus connected to the image forming apparatus through a network.

2. Description of the Related Art

In a field in which an image is formed on a sheet based on image data, a system has been proposed which enables one or a plurality of image forming apparatuses to be managed by an information terminal apparatus such as a PC by connecting the image forming apparatuses to the information terminal apparatus, or which enables image data to be printed at an image forming apparatus by transmitting the image data from an information terminal apparatus to the image forming apparatus.

There exists a remote panel function as a function for remotely operating an image processing apparatus connected through a network. Typically, it is assumed that a remote panel is connected from a PC or a tablet terminal and used at a location distant from machine which is a connection target. If, in such an environment, for example, a user transmits printing data from a PC, but an error has occurred for some reasons, the user needs to go to the location of the machine and directly operate an operating unit or the machine to eliminate the error. However, there is a case where the error could have been addressed through operation from the remote panel according to types of errors, in which case an unnecessary burden is placed on the user.

To address such a problem, for example, Japanese Patent Laid-Open No. 2005-18607 discloses a system in which if some abnormity has occurred on an image forming apparatus, information of the image forming apparatus on which the abnormity has occurred is preferentially displayed on a remote operating apparatus. In this system, in an environment where a plurality of remote panels are displayed, a user can promptly know occurrence of a problem through the remote operating apparatus which preferentially displays and highlights a remote panel of the image forming apparatus at which the problem has occurred.

However, in the above-described conventional image forming system, for example, the remote panel has to be already activated upon printing. Because the remote panel regularly acquires image information of an operation panel during activation, a large size of data regularly flows on a network, which causes a problem of increase in traffic.

The present invention has been made in view of the above-described circumstances, and at least one of object thereof is to provide an image forming apparatus, an information terminal apparatus, an image forming system, an image forming apparatus management and control method, a computer-readable recording medium storing an image forming apparatus control program and a computer-readable recording medium storing an information terminal apparatus control program, which can improve operation efficiency of a system.

SUMMARY OF THE INVENTION

To achieve at least one of the abovementioned objects, an image forming apparatus which reflects one aspect of the present invention includes an image forming unit that forms an image on a sheet based on image data, an operation display unit for operation and display, a communication unit that performs communication via a network and a control unit that manages and controls the apparatus, and, if a predetermined event has occurred at the apparatus, the control unit gives a notification for activating a remote panel for the apparatus to an information terminal apparatus connected to the network through the communication unit.

In the image forming apparatus, if the remote panel cannot be utilized at the information terminal apparatus, it is preferable that the control unit gives a notification for displaying an alarm to the information terminal apparatus.

In the image forming apparatus, it is preferable that the control unit provides information for displaying the alarm to the information terminal apparatus according to a request from the information terminal apparatus.

In the image forming apparatus, if the remote panel cannot be utilized at the information terminal apparatus and the image forming apparatus is managed by a managing apparatus, it is preferable that the control unit gives a notification of occurrence of the event to the managing apparatus.

In the image forming apparatus, it is preferable that the control unit stores information of the information terminal apparatus, and, if the event has occurred, gives a notification for activating the remote panel to the registered information terminal apparatus.

In the image forming apparatus, it is preferable that the image forming apparatus further comprising an information acquiring unit that acquires information of the image forming apparatus, wherein the control unit can transmit the notification for activating the remote panel with the information acquired at the information acquiring unit being added to the notification.

In the image forming apparatus, it is preferable that the remote panel enables only remote display or enables remote operation and display for the image forming apparatus.

In the image forming apparatus, it is preferable that the control unit gives the notification to the information terminal apparatus which is a transmission source of the image data.

To achieve at least one of the abovementioned objects, a computer-readable recording medium storing an image forming apparatus control program which reflects one aspect of the present invention is a computer-readable recording medium which stores the image forming apparatus control program for operating a control unit that controls an image forming apparatus, and includes the program for causing the control unit to execute the steps of detecting that a predetermined event has occurred at the image forming apparatus, and, if occurrence of the predetermined event is detected, giving a notification for activating a remote panel for the image forming apparatus to an information terminal apparatus connected to the image forming apparatus via a network.

In the computer-readable recording medium storing an image forming apparatus control program, it is preferable that the program causes the control unit to execute the step of, if the remote panel cannot be utilized at the information terminal apparatus, giving a notification for displaying an alarm to the information terminal apparatus.

In the computer-readable recording medium storing an image forming apparatus control program, it is preferable that the program causes the control unit to execute the step of, if there is a request from the information terminal apparatus, providing information for displaying the alarm to the information terminal apparatus.

To achieve at least one of the abovementioned objects, an image forming system which reflects one aspect of the present invention includes an image forming apparatus including an image forming unit that forms an image on a sheet based on image data, an operation display unit for operation and display and a communication unit that performs communication via a network, and an information terminal apparatus including a terminal operation display unit for operation and display and a terminal communication unit that performs communication via the network, the image forming apparatus being connected to the information terminal apparatus via the network, the image forming system further including a control unit that manages and controls the image forming apparatus and a terminal control unit that controls the information terminal apparatus, and, when a predetermined event has occurred at the image forming apparatus, the control unit gives a notification for activating a remote panel for the image forming apparatus to the information terminal apparatus connected to the network through the communication unit.

In the image forming system, it is preferable that upon receiving the notification for activating the remote panel, the terminal control unit activates the remote panel for the image forming apparatus on the terminal operation display unit.

In the image forming system, if the remote panel cannot be utilized at the information terminal apparatus, it is preferable that the control unit gives a notification for displaying an alarm to the information terminal apparatus.

In the image forming system, it is preferable that upon receiving the notification for displaying the alarm, the terminal control unit activates application for displaying the alarm at the terminal operation display unit.

In the image forming system, if the remote panel cannot be utilized at the information terminal apparatus, it is preferable that the control unit gives a notification of occurrence of the event to a managing apparatus that manages the image forming apparatus.

In the image forming system, it is preferable that the control unit stores information of the information terminal apparatus, and, when the event has occurred, gives a notification for activating the remote panel to the registered information terminal apparatus.

In the image forming system, it is preferable that the information terminal apparatus is a transmission source of the image data.

To achieve at least one of the abovementioned objects, an image forming apparatus management and control method which reflects one aspect of the present invention is a method for managing and controlling an image forming apparatus and includes judging whether a predetermined event has occurred at the image forming apparatus, and, when it is judged that the predetermined event has occurred, giving a notification for activating a remote panel for the image forming apparatus to an information terminal apparatus connected to the image forming apparatus.

In the image forming apparatus management and control method, it is preferable that, if the remote panel cannot be utilized at the information terminal apparatus, a notification for displaying an alarm is given to the information terminal apparatus.

In the image forming apparatus management and control method, it is preferable that information for displaying the alarm is provided to the information terminal apparatus according to a request from the information terminal apparatus.

In the image forming apparatus management and control method, if the remote panel cannot be utilized at the information terminal apparatus, it is preferable that a notification of the event is given to a managing apparatus that manages the image forming apparatus.

In the image forming apparatus management and control method, it is preferable that information of the information terminal apparatus is stored, and, if the event has occurred, a notification for activating the remote panel is given to the registered information terminal apparatus.

In the image forming apparatus management and control method, it is preferable that the notification for activating the remote panel is given with information acquired at an information acquiring unit that acquires information of the image forming apparatus being added to the notification.

To achieve at least one of the abovementioned objects, an information terminal apparatus which reflects one aspect of the present invention includes a terminal operation display unit for operation and display, a terminal communication unit that performs communication via a network, and a terminal control unit that controls the apparatus, and, when receiving a notification for activating a remote panel through the network and the terminal communication unit, the terminal control unit activates the remote panel for an image forming apparatus.

In the information terminal apparatus, it is preferable that, upon receiving a notification for displaying an alarm via the network and the terminal communication unit, the terminal control unit activates application for displaying the alarm.

In the information terminal apparatus, it is preferable that, upon receiving information for displaying the alarm via the network and the terminal communication unit, the terminal control unit performs display relating to display of the alarm at the terminal operation display unit.

In the information terminal apparatus, it is preferable that the information terminal apparatus is a transmission source for transmitting image data for forming an image to the image forming apparatus.

To achieve at least one of the abovementioned objects, a computer-readable recording medium storing an information terminal apparatus control program, which reflects one aspect of the present invention, is a computer-readable recording medium storing a program for operating a terminal control unit, the terminal control unit controlling an information terminal apparatus connected to an image forming apparatus through a network, and the computer-readable recording medium stores a program for causing the terminal control unit to execute the steps of receiving a notification for activating a remote panel for the image forming apparatus via the network, and activating the remote panel in response to the notification.

In the computer-readable recording medium storing an information terminal apparatus control program, it is preferable that the program causing the terminal control unit to execute the steps of:

receiving a notification for displaying an alarm for the image forming apparatus via the network; and activating application for displaying the alarm according to display of the alarm.

In the computer-readable recording medium storing an information terminal apparatus control program, it is preferable that the program causing the terminal control unit to execute the step of upon receiving information for displaying the alarm via the network and the terminal communication unit, performing display relating to the display of the alarm at the terminal operation display unit using the application.

DETAILED DESCRIPTION OF THE EMBODIMENT

One embodiment of the present invention will be described below based on the accompanying drawings.

Figure 1:
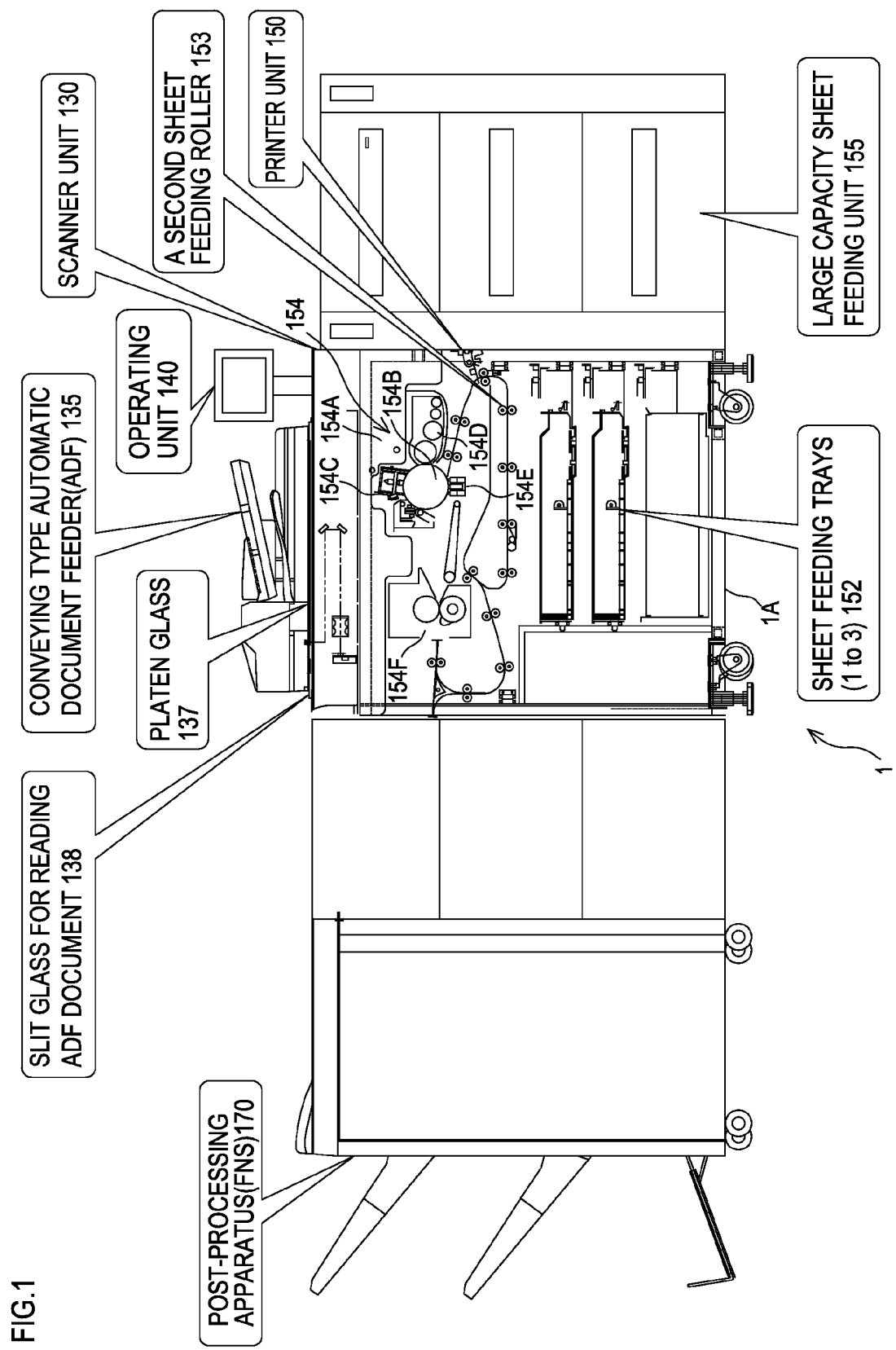
FIG. 1 is a diagram illustrating a mechanical outline of an image forming apparatus in one embodiment of the present invention.

FIG. 1 is a central cross-sectional view of an image forming apparatus and illustrates a mechanical configuration of the image forming apparatus. The configuration will be described below.

An image forming apparatus 1 is configured so that a large capacity sheet feeding unit 155 is connected to a preceding stage side of an image forming apparatus body 1A and a post-processing apparatus (FNS) 170 is connected to a subsequent stage side of the image forming apparatus body 1A.

In the image forming apparatus 1, sheets can be conveyed between apparatuses, and the apparatuses can be communicated with each other. While the image forming apparatus 1 is configured to include the large capacity sheet feeding unit 155 and the post-processing apparatus (FNS) 170, the image forming apparatus can be configured with the image forming apparatus body alone.

In the image forming apparatus body 1A, a scanner unit 130 including a CCD 131 and a conveying type automatic document feeder (ADF) 135 are provided on an upper side of the image forming apparatus body 1A, and an image of a document can be read through platen glass 137 or slit glass for reading ADF document 138.

An image reading unit is configured with the above-described scanner unit 130, the conveying type automatic document feeder (ADF) 135, the platen glass 137, the slit glass for reading ADF document 138, and the like.

Further, on the upper side of the image forming apparatus body 1A, an operating unit 140 which is comprised of a touch panel is provided at a portion where the platen glass 137 is not located, so as to enable operation by an operator and enable display of information. The operating unit 140 configures an operating unit and is also used as a display unit of the present invention. It should be noted that the operating unit and the display unit can be configured separately in the present invention. The operating unit 140 corresponds to an operation display unit of the present invention.

On a lower side of the image forming apparatus body 1A, a plurality of sheet feeding trays (1 to 3) 152 (three stages in FIG. 1) are disposed, and the large capacity sheet feeding unit 155 having sheet feeding trays are disposed so as to be attached to the image forming apparatus body 1A.

Within the image forming apparatus body 1A, a conveyance path that conveys a sheet fed from any of the sheet feeding trays, a second sheet feeding roller 153, and the like, are provided, and an image forming unit 154 configured with an LD 154A, a photoreceptor 154B, a charger 154C, a developer 154D, a transferring unit 154E, a fixer 154F, and the like, is provided in the middle of the conveyance path within the image forming apparatus body 1A. Further, in the large capacity sheet feeding unit 155, conveyance paths (not illustrated) for respectively conveying fed sheets and introducing the sheets into the image forming apparatus body 1A are provided.

Still further, the post-processing apparatus (FNS) 170 conveys a sheet on which an image has been printed and discharges the sheet without performing post-processing or after performing post-processing.

A printer unit 150 is configured with the above-described sheet feeding trays (1 to 3) 152, the conveyance paths, the second sheet feeding roller 153, the image forming unit 154, the large capacity sheet feeding unit 155, and the like.

In the image forming unit 154, the charger 154C, the developer 154D and the transferring unit 154E are disposed around the photoreceptor 154B. The charger 154C charges a surface of the photoreceptor 154B uniformly prior to image writing. The LD 154A forms an electrostatic latent image on the photoreceptor 154B by radiating a semiconductor laser to the photoreceptor 154B whose surface has been uniformly charged. The developer 154D develops the electrostatic latent image formed on the photoreceptor 154B by the LD 154A using a toner member. Through this development treatment, a toner image is formed on the photoreceptor 154B. The transferring unit 154E transfers the toner image of the photoreceptor 154B on a sheet conveyed from the sheet feeding trays (1 to 3) 152 or the large capacity sheet feeding unit 155. The sheet on which the toner image is transferred is separated from the photoreceptor 154B and conveyed to the fixer 154F. The toner member remained on the photoreceptor 154B is removed by a cleaning unit which is not illustrated.

The fixer 154F fixes the toner image transferred on a surface side of the sheet by heating the conveyed sheet. The sheet which has been subjected to fixing treatment is conveyed as is to the post-processing apparatus (FNS) 170 located at a side of the image forming apparatus body 1A in the case of single-side printing.

The post-processing apparatus (FNS) 170 performs post-processing such as stapling, punching, center folding, and the like.

Meanwhile, in the case of double-side printing, the sheet after fixing is switched back, and a certain image is transferred on a back side of the sheet at the image forming unit 154. Then, the sheet on which the images have been formed on the both sides is conveyed to the post-processing apparatus (FNS) 170 after fixing.

Figure 2:
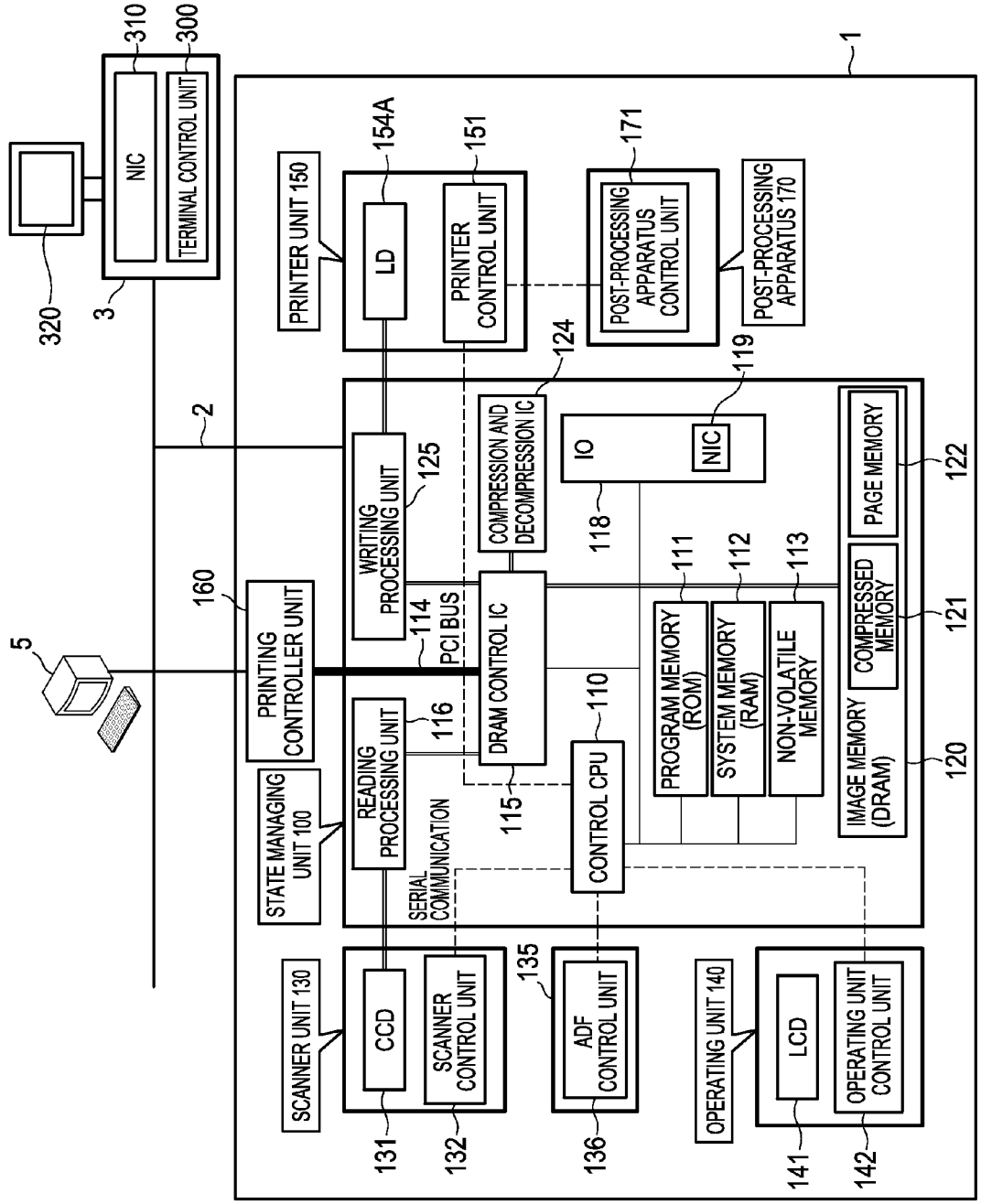
FIG. 2 is a diagram illustrating control blocks of an image forming system including the image forming apparatus in one embodiment of the present invention.

Next, control blocks of an image forming system including the image forming apparatus 1 will be described based on FIG. 2.

The image forming apparatus body 1A has large blocks of a state managing unit 100, a scanner unit 130, an operating unit 140 and a printer unit 150, and is further connected to an information terminal apparatus 3 and a managing apparatus 5 through a network 2. Further, the image forming apparatus body 1A is connected to the network 2 via a printing controller unit 160.

The state managing unit 100 has a PCI bus 114 connected to the printing controller unit 160, and a DRAM control IC 115 is connected to the PCI bus 114. An image memory (DRAM) 120 is connected to the DRAM control IC 115. The image memory (DRAM) 120 has a compressed memory 121 for storing compressed image data, and a page memory 122 for temporarily storing uncompressed image data to be printed prior to image formation.

The image data acquired at the above-described printing controller unit 160 is transmitted to the DRAM control IC 115 through the PCI bus 114 in association with printing operation.

Further, the state managing unit 100 includes a control CPU 110 to which the DRAM control IC 115 is connected.

Still further, a program memory 111 which is configured with a ROM, or the like, and which stores a program, or the like, for operating the control CPU 110, a system memory 112 which is configured with a RAM, or the like, and which is used as a working area, or the like, and a non-volatile memory 113 configured with a flash memory, or the like, are connected to the control CPU 110. In the non-volatile memory 113, initial printing setting information of the image forming apparatus body 1A, machine setting information such as a process control parameter, initial data of output settings, or the like, are stored so as to be able to be read out, and control information of each unit included in the image forming apparatus 1 is also stored.

Further, in the non-volatile memory 113, information relating to a predetermined event in the image forming apparatus 1 for starting a remote panel is registered. The information relating to the predetermined event can be registered by initial settings or the operator can newly set an event through the operating unit 140 or can edit or delete the set of event. While the predetermined event includes paper out and a printing error, the predetermined event of the present invention is not particularly limited thereto, and can be set as appropriate by aiming at an event which is preferably reported to the outside, and it is also possible to register different events as the predetermined event according to types of apparatuses and locations where the apparatus is used.

Further, in the non-volatile memory 113, a transmission destination which is the information terminal apparatus or the managing apparatus to which a notification is given when the predetermined event has occurred is registered, and the transmission destination can be designated by, for example, an IP address or a designated port. However, the designated destination is not limited to the IP address or the designated port. Further, it is also possible to configure the non-volatile memory 113 so as to be able to register whether or not any of a plurality of information terminal apparatuses can activate the remote panel.

Further, in the system memory 112, it is possible to render a display screen to be transmitted to the information terminal apparatus 3 using a graphic driver, or the like, store the display screen and transmit the screen data to the information terminal apparatus 3 as needed when causing the remote panel to operate.

The control CPU 110 can read non-volatile data of the non-volatile memory 113 and can write certain data in the non-volatile memory 113.

The control CPU 110 operates by an image forming apparatus control program stored in the program memory 111, controls operation of each unit of the image forming apparatus 1 according to adjusted values of the above-described mechanical setting information and printing setting information, output settings, unit control information, or the like, manages each unit of the image forming apparatus 1, and notifies an apparatus connected to the network when a predetermined event has occurred. The control CPU 110 configures the control unit of the present invention.

The control CPU 110 enables output setting and operation instruction of a job, setting of control information of units, and communication instruction to acquire control information for a server through the operating unit 140.

Further, in the present invention, it is also possible to provide the control unit that manages and controls the image forming apparatus outside the image forming apparatus body.

The scanner unit 130 includes a CCD 131 that performs optical reading, and a scanner control unit 132 that controls the whole of the scanner unit 130. The scanner control unit 132 is connected to the control CPU 110 in a manner allowing serial communication. Further, the CCD 131 is connected to a reading processing unit 116 that processes image data read by the CCD 131, and the reading processing unit 116 is controllably connected to the DRAM control IC 115.

The reading processing unit 116 performs various processing such as analog signal processing, A/D (Analog to Digital) conversion processing and shading processing on an analog image signal input from the CCD 131 to generate digital image data and outputs the digital image data to a compression and decompression IC 124.

Further, the auto document feeder (ADF) 135 that automatically feeds documents is provided on an upper platen glass of the image forming apparatus body 1A, and the auto document feeder (ADF) 135 has an ADF control unit 136 that controls the auto document feeder (ADF) 135. The ADF control unit 136 is controllably connected to the control CPU 110 and controls the auto document feeder (ADF) 135 according to an instruction from the control CPU 110.

The operating unit 140 which functions as both a display unit and an operating unit, includes an LCD 141 configured with a touch panel and an operating unit control unit 142 that controls the whole of the operating unit, and the operating unit control unit 142 is connected to the control CPU 110 in a manner allowing serial communication.

Under the control of the control CPU 110, the operating unit 140 can set output conditions and input machine settings such as operation control conditions in the image forming apparatus body 1A, input settings of sheet information (a size and a sheet type) of each sheet feeding tray, display content of the settings, display certain information such as a message, and, further, can manually set control information, perform instruction operation to acquire control information by connecting to the server, or the like, through the LCD 141.

The compression and decompression IC 124 which can compress or decompress image data is connected to the DRAM control IC 115. The DRAM control IC 115 controls compression processing of image data and decompression processing of compressed image data by the compression and decompression IC 124 according to an instruction from the control CPU 110 and also controls input and output of image data to and from the image memory (DRAM) 120.

A writing processing unit 125 which is connected to an image forming unit including the LD 154A of the printer unit 150, or the like, generates write data to be used for operation of the LD 154A based on the image data.

The printer unit 150 is configured with the above-described image forming unit 154, a sheet feed tray, a conveyance path, a reverse conveyance path, a fixer, and the like.

Further, the printer unit 150 includes a printer control unit 151 that controls the whole (such as sheet feeding, image formation, sheet ejection and post-processing) of the printer unit 150, and the printer control unit 151 is connected to the above-described control CPU 110 in a manner allowing serial communication. The printer control unit 151 operates according to a control instruction from the control CPU 110, controls the printer unit 150 and performs sheet conveyance, image formation, or the like.

Further, a post-processing apparatus control unit 171 of the post-processing apparatus (FNS) 170 is connected to the printer control unit 151. The instruction to control the post-processing apparatus from the control CPU 110 is delivered to the post-processing apparatus control unit 171 through the printer control unit 151, and the post-processing apparatus (FNS) 170 is controlled by the post-processing apparatus control unit 171.

A DRAM control IC which is provided at the printing controller unit 160 and which is not illustrated is connected to the PCI bus 114. The printing controller unit 160 is connected to the network 2 via a LAN interface which is not illustrated.

When the image forming apparatus body 1A is used as a network printer or a network scanner, the printing controller unit 160 is used to receive image data, or the like, at the image forming apparatus body 1A from an information terminal unit connected to the network 2 or transmit the image data acquired at the scanner unit 130 to the information terminal unit connected to the network 2.

Further, an IO unit 118 is connected to the control CPU 110. The IO unit 118 operates as an interface for providing and receiving information between units within the image forming apparatus 1. If an event such as a paper jam occurs, and the like at the image forming apparatus body 1A, information relating to the event is transmitted to the control CPU 110.

Further, the IO unit 118 includes a NIC 119 (Network Interface Card), and the network 2 is connected to the NIC 119. The NIC 119 which performs transmission and reception with the information terminal apparatus 3 such as a PC (Personal Computer), the managing apparatus 5, or the like, connected to the network 2, functions as a communication unit of the present invention. It should be noted that the function for performing communication is not limited to the above-described NIC 119, and it is also possible to use a function which does not use the IO unit.

The information terminal apparatus 3 has a terminal control unit 300 that controls the whole of the information terminal apparatus 3, and an NIC 310 which is connected to the network 2 is controllably connected to the terminal control unit 300. The NIC 310 corresponds to a terminal communication unit. The terminal control unit 300 operates by a terminal control program stored in a storage unit, or the like, of the terminal control unit 300.

In the storage unit of the terminal control unit 300, application for activating a remote panel for the image forming apparatus 1 as a client, a browser and other application are stored so as to be able to be activated, and these application can be activated and operate by the operation of the terminal control unit 300. It should be noted that the remote panel can be either one which merely enables display, or one which enables both display and operation.

Further, the information terminal apparatus 3 has a terminal operation display unit 320. It is possible to configure the terminal operation display unit 320 to enable both operation and display through a touch panel, or the like, or it is also possible to provide an operating unit and a display unit separately.

Next, basic operation of the above-described image forming apparatus 1 will be described.

First, a procedure for accumulating image data in the image forming apparatus body 1A will be described. A case of the image forming apparatus body 1A in which the scanner unit 130 reads an image and generates image data will be described. The scanner unit 130 optically reads an image from a document using the CCD 131. At this time, the operation of the CCD 131 is controlled by the scanner control unit 132 which receives an instruction from the control CPU 110. The document can be read while the document is automatically fed by the auto document feeder (ADF) 135 or after the document is placed on the platen glass.

The control CPU 110 operates according to a program and issues an instruction to the scanner unit 130 based on the operation (a reading instruction or a copy instruction) by the operating unit 140. The image read by the CCD 131 is subjected to data processing at the reading processing unit 116, and the image data subjected to data processing is transmitted to the compression and decompression IC 124 via the DRAM control IC 115 and compressed using a predetermined method. The compressed data is stored in the image memory (DRAM) 120 via the DRAM control IC 115.

Alternatively, it is also possible to input the image data to the image forming apparatus body 1A via the network 2. The above-described image data includes, for example, data generated by an application program, or the like, of the information terminal apparatus 3, or the like. A method for generating image data is not particularly limited thereto.

The image data is received at the printing controller unit 160 through the network 2, and printing data extracted at the printing controller unit 160 is transferred to the DRAM control IC 115 via the PCI bus 114 and temporarily stored in the page memory 122. The data stored in the page memory 122 is delivered to the compression and decompression IC 124 via the DRAM control IC 115 and subjected to compression processing, and stored in the compressed memory 121 via the DRAM control IC 115.

When the above-described image data is accumulated, output setting is performed before or after accumulation of the image data. The output setting can be performed by displaying a setting screen through which operation can be input at the above-described operating unit 140 and allowing the operator to input operation. Further, output setting is also performed by initial setting when output setting items are selected at the initial setting and the operator does not input settings.

When an image is output at the image forming apparatus 1, that is, when the image forming apparatus 1 is used as copy machine or a printer, the image data stored in the compressed memory 121 is sent out to the compression and decompression IC 124 via the DRAM control IC 115 and decompressed, and the decompressed data is sent out to the writing processing unit 125 and written on the photoreceptor 154B charged at the charger 154C by the LD 154A.

In the printer unit 150, each unit is controlled by the printer control unit 151 which receives an instruction from the control CPU 110. In the image forming unit 154, a latent image written on the photoreceptor 154B is developed as a toner image at the developer 154D, and the toner image is transferred on a sheet supplied by the conveyance path by the transferring unit 154E, and fixed at the fixer 154F. The toner image may be transferred to a sheet through an intermediate transferring part.

After the toner image is transferred on the sheet, at the photoreceptor 154B, the residual toner is removed by a cleaning unit which is not illustrated. The sheet is fed from the large capacity sheet feeding unit 155 or the sheet feeding trays (1 to 3) 152 within the image forming apparatus body 1A according to settings. The large capacity sheet feeding unit 155 and the sheet feeding trays (1 to 3) 152 within the image forming apparatus body 1A are controlled according to the control information.

The sheet on which the image has been formed is conveyed to the post-processing apparatus (FNS) 170 through the conveyance path, or reversed at the reverse conveyance path and recirculated to the image forming unit. The recirculated sheet is conveyed to the post-processing apparatus (FNS) 170 after image formation, and fixing have been performed on the back side. In the post-processing apparatus (FNS) 170, control is performed directly or via each post-processing apparatus control unit according to the control information from the control CPU 110, and desired processing is performed.

While the present embodiment has been described assuming a case where a black-and-white image is formed, it is also possible to use an image forming apparatus body in which a photoreceptor, or the like, is provided for each color (for example, cyan, magenta, yellow and black).

Further, in the image forming apparatus 1, if a predetermined event has occurred, a notification for activating the remote panel is given to the information terminal apparatus 3 via the NIC 119, the network 2 and the NIC 310 by the operation of the control CPU 110. If there are a plurality of information terminal apparatuses 3 and a notification destination is designated, a notification is given to the designated information terminal apparatus 3. As the notification destination, an information terminal apparatus 3 to which the image data has been transmitted can be set as the transmission destination in addition to a transmission destination stored in the non-volatile memory.

Taking an example of a VNC, a VNC (trademark, the same shall apply hereafter) server is provided at the image forming apparatus 1, and a VNC client is provided at the information terminal apparatus 3. The control CPU 110, or the like, can be used as the VNC server.

The VNC client acquires image data from the VNC server of the image forming apparatus 1, and displays a screen obtained by passing the image data to the terminal control unit 300 of the VNC client, at the terminal operation display unit 320. At this time, the VNC client can have a function of accepting operation with respect to the screen and delivering the operation to the VNC server of the image forming apparatus 1. By this means, if a predetermined event has occurred, it is possible to recognize occurrence of the event immediately through the remote panel of the information terminal apparatus 3. Further, because the remote panel is activated only when it is needed, it is possible to reduce traffic on the network. The remote panel can be closed by operation of the operator or by time-out based on the set operating time.

Further, the remote panel includes a remote panel URL in addition to the above-described remote panels. The type of remote panel of the present invention is not particularly limited thereto.

Still further, it is not necessary to display the same screen as the screen of the image forming apparatus 1 at the remote panel, and the remote panel enables display and operation corresponding to the image forming apparatus 1. For example, it is also possible to adopt a configuration in which, for example, application such as a browser is activated at the information terminal apparatus 3 in association with activation of the remote panel, and information is transmitted from the image forming apparatus 1 to the information terminal apparatus 3 through the network 2 using a markup language, or the like, so that the information terminal apparatus 3 enables display of a screen and operation corresponding to the image forming apparatus 1.

Further, when a notification for activating the remote panel at the information terminal apparatus 3 is given at the image forming apparatus 1, it is possible to transmit information acquired through an information acquiring unit provided at the image forming apparatus 1 to the information terminal apparatus 3 along with the notification. The information terminal apparatus 3 can activate application for displaying the information according to the information. The information acquiring unit can be originally provided at the image forming apparatus 1, or can be specially provided for confirming the information at the information terminal apparatus 3. For example, examples of the information acquiring unit include a live camera that displays inside of the image forming apparatus 1 and a unit which displays content of a hard disk provided at the image forming apparatus 1.

Further, if it is recognized that the remote panel cannot be activated at the information terminal apparatus 3, it is possible to give a notification for displaying an alarm to the information terminal apparatus. Whether or not the remote panel can be activated can be judged by the information terminal apparatus 3 storing whether or not the remote panel can be activated in the non-volatile memory 113, or the like, and judging whether or not the information terminal apparatus 3 which is a transmission destination can be activated at the image forming apparatus 1 according to the storing data in the non-volatile memory 113, or the like. Further, if the remote panel cannot be activated when the information terminal apparatus 3 receives the notification for activating the remote panel, the information terminal apparatus 3 responds to the image forming apparatus 1 accordingly, thereby the image forming apparatus 1 side can recognize that the remote panel cannot be activated.

When receiving a notification for displaying an alarm, the information terminal apparatus 3 activates application for displaying the alarm and requests the image forming apparatus 1 for information for displaying the alarm. In response to this request, the image forming apparatus 1 transmits the information for displaying the alarm to the information terminal apparatus 3 through the network 2. In response to this information, the information terminal apparatus 3 displays the alarm using application. It is also possible to display the alarm along with content of the event or simply display the alarm.

Further, if the image forming apparatus 1 is connected to the managing apparatus which manages the image forming apparatus 1 through the network and the remote panel cannot be activated at the information terminal apparatus 3, the image forming apparatus 1 can notify the managing apparatus of occurrence of the event. The managing device can perform display of the event, or the like in response to this notification. Examples of the managing apparatus include a managing server, or the like.

Figure 3:
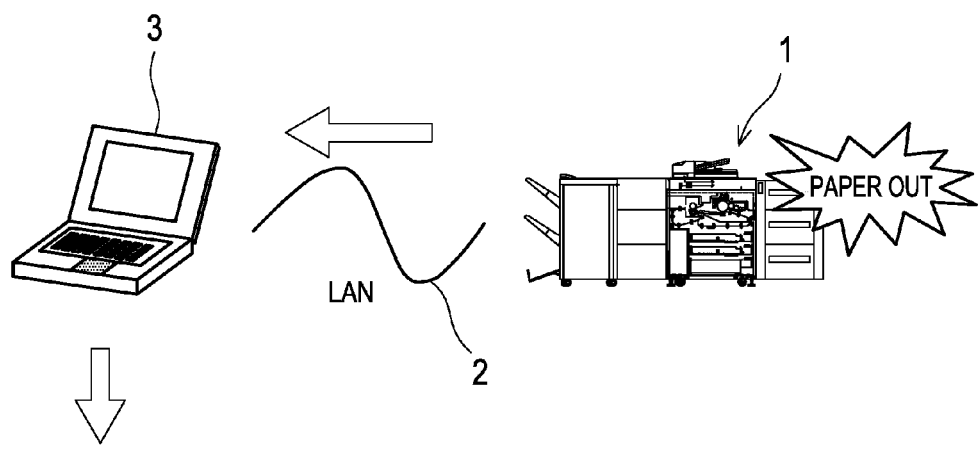
FIG. 3 is a diagram illustrating an outline of an operation state when a predetermined event has occurred at the image forming apparatus in one embodiment of the present invention.

Next, a situation where a predetermined event has occurred in the image forming apparatus 1 and a notification is given will be described using a schematic diagram of FIG. 3.

If an event such as paper out has occurred at the image forming apparatus 1, a notification of occurrence of the event or a notification for displaying an alarm is transmitted to an apparatus of terminal (the information terminal apparatus 3 or the managing apparatus) through the network 2 such as a LAN.

The apparatus of terminal analyzes the received notification and judges whether the notification is a notification of occurrence of the event or a notification for displaying an alarm. The terminal apparatus performs activation of the remote panel, activation of management application, activation of camera application (such as confirmation of a state of JAM), or the like, according to the judgment result.

Figure 4:
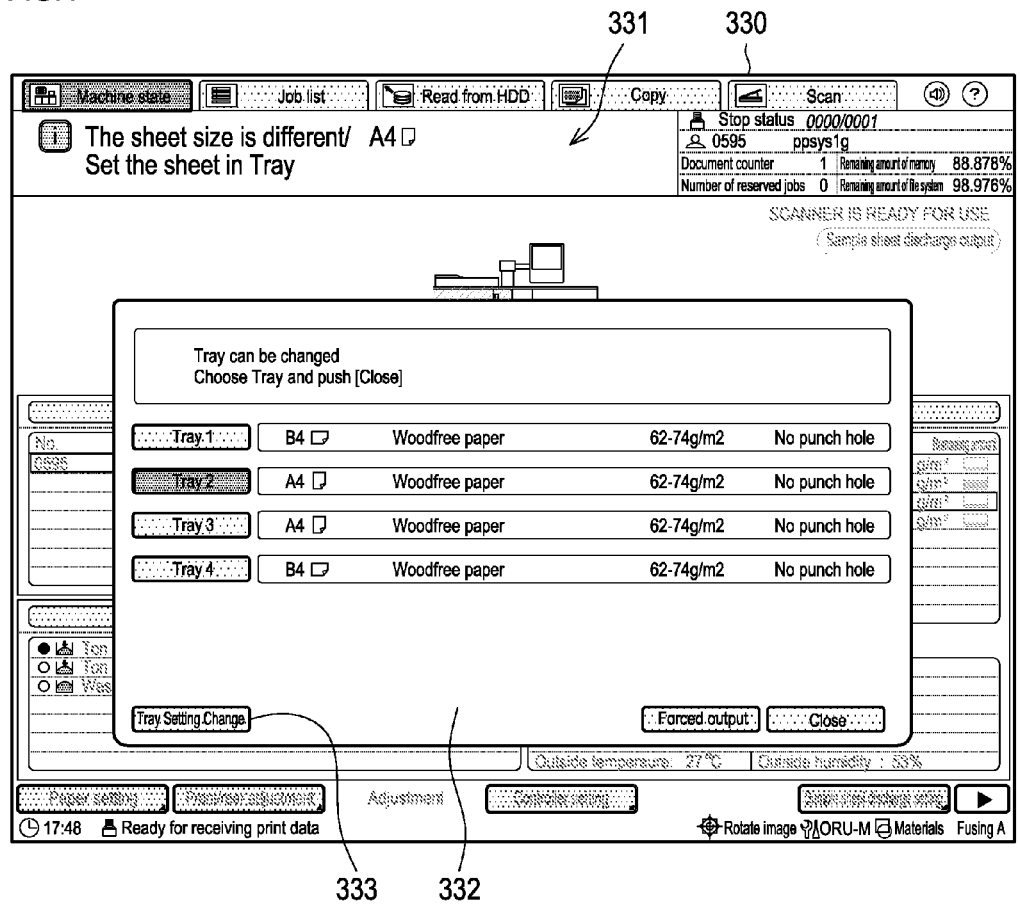
FIG. 4 is a diagram illustrating an example of a remote panel displayed at an information terminal apparatus when a predetermined event has occurred at the image forming apparatus in one embodiment of the present invention.

FIG. 4 illustrates the remote panel 330 displayed at the information terminal apparatus 3 based on the occurrence of the event, which is an event where the set sheet size in the sheet feed tray is different from job settings. The image forming apparatus 1 transmits a notification for activating the remote panel to the information terminal apparatus 3 in association with the occurrence of the event, and the information terminal apparatus 3 activates the remote panel in response to this notification, acquires required screen information from the image forming apparatus 1 and displays the screen information at the terminal operation display unit 320.

At the remote panel 330, the same screen as the screen displayed at the operating unit 140 of the image forming apparatus 1 is displayed, and the remote panel 30 can not only perform display, but also enables operation. It should be noted that if the operating unit 140 is a touch panel and the terminal operation display unit 320 is configured with a display unit and an operating unit such as a mouse, it is also possible to use the operation method different from that for the image forming apparatus 1, and operation can be performed by clicking an operation area using the mouse.

At the remote panel 330, as the notification of the occurrence of the event, a notification indicating that a sheet size of the tray 1 is different and a notification requesting for setting of a required sheet to the tray 1 are displayed at a display field 331. Further, a tray selection window 332 is displayed at an inner side of the remote panel 330, so that it is possible to continue printing by changing the sheet feeding tray. When the sheet feeding tray is selected and a tray setting change button 333 is pressed down, the content of the operation with respect to the remote panel 330 is transmitted from the information terminal apparatus 3 to the image forming apparatus 1 through the network 2, and action corresponding to the operation is executed at the image forming apparatus 1, thereby printing is performed.

Next, a procedure for an image forming apparatus management and control method using an image forming apparatus control program executed at the control CPU 110 of the image forming apparatus 1 and an information terminal apparatus control program executed at the terminal control unit 300 of the information terminal apparatus 3 will be described.

First, as one aspect, a case will be assumed where a user transmits printing data from the information terminal apparatus 3 and tries to execute printing, but an error has occurred because a sheet of a size which does not match the printing data is placed on the designated tray in the image forming apparatus 1.

In this case, a printer driver operating at the terminal operating unit 300 on the information terminal apparatus 3 is notified of a fact that the printing execution has failed through the network, and paper out is displayed. The printer driver is included in the information terminal control program.

In the related art, the user confirms content of the error, and needs to manually start the remote panel or actually go to a location where copy machine is placed to confirm the operating unit, which is troublesome.

According to the examination of the present invention, if paper out has occurred after printing data was received, the copy machine side performs judgment and notifies a designated port at the information terminal apparatus 3 side of an event of paper out. When the information terminal apparatus 3 side receives an event at the designated port, analyzes the content of the event, and, in this case, automatically starts the remote panel for the image forming apparatus where the error has occurred. The user can understand that paper out has occurred at a glance and can change the tray on the remote panel which has been automatically started, so that it is possible to reduce burden on the user compared to the related art.

Figure 5:
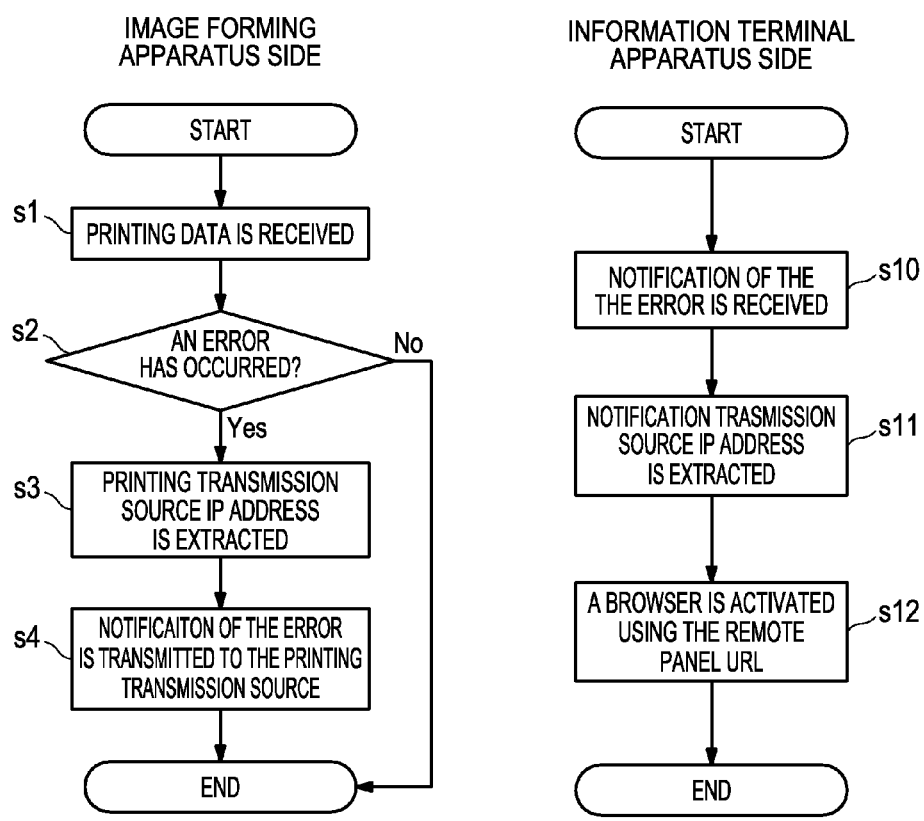
FIG. 5 is a flowchart illustrating an example of a processing procedure in an image forming apparatus management and control method in one embodiment of the present invention.

The above-described procedure will be described below based on the flowchart of FIG. 5.

The procedure at the image forming apparatus 1 side will be described.

Printing data is received (step s1), and it is judged whether an error has occurred (step s2).

If an error has not occurred (step s2, No), the processing is finished. If an error has occurred (step s2, Yes), a printing transmission source IP address that performs event notification is extracted from the non-volatile memory 113, or the like (step s3). The event notification targets at an image data transmission source. Subsequently, as a notification of occurrence of the event, a notification of the error is transmitted to the printing transmission source through the network (step s4).

Next, the procedure at the information terminal apparatus 3 side will be described.

The notification of the error is received through the network (step s10), and the notification transmission source IP address is extracted (step s11). A browser is activated using the remote panel URL for the notification transmission source (step s12), and the processing is finished.

While an example of an error upon printing has been described above, the above-described procedure can be also utilized in a similar manner upon occurrence of abnormality which can be temporarily relieved.

Next, other aspects will be described.

While in the above-described aspect, a notification is given to the information terminal apparatus 3 connected to the image forming apparatus 1 through the network when a problem such as paper out has occurred on the image forming apparatus 1, because, typically, the remote panel can be used only from the IP address registered using administrator authority, in the case of the information terminal apparatus 3 which is not registered, there is a case where the remote panel cannot be connected even upon occurrence of a problem.

To address this problem, the image forming apparatus 1 side confirms whether or not the IP address of the information terminal apparatus 3 to which the printing data has been transmitted is registered as the information terminal apparatus 3 which allows use of the remote panel upon occurrence of a problem, and if the IP address is registered, a notification for activating the remote panel is transmitted as in the above-described aspect. If the IP address is not registered, a notification for activating an alarm display page which can be browsed by a Public user is transmitted, and a notification is given to an administrator. By this means, even if the notification destination is the information terminal apparatus 3 which cannot use the remote panel, it is possible to present minimal information and possibility of access to the remote panel to the user.

Further, it is also possible to adopt a configuration where the IP address of the information terminal apparatus 3 to be notified is registered in the image forming apparatus in advance. In the case of this configuration, for example, even if an unexpected problem other than upon reception of printing data has occurred, a notification for activating the remote panel can be transmitted to the registered information terminal apparatus 3, so that it is possible to address a wide variety of problems.

Figure 6:
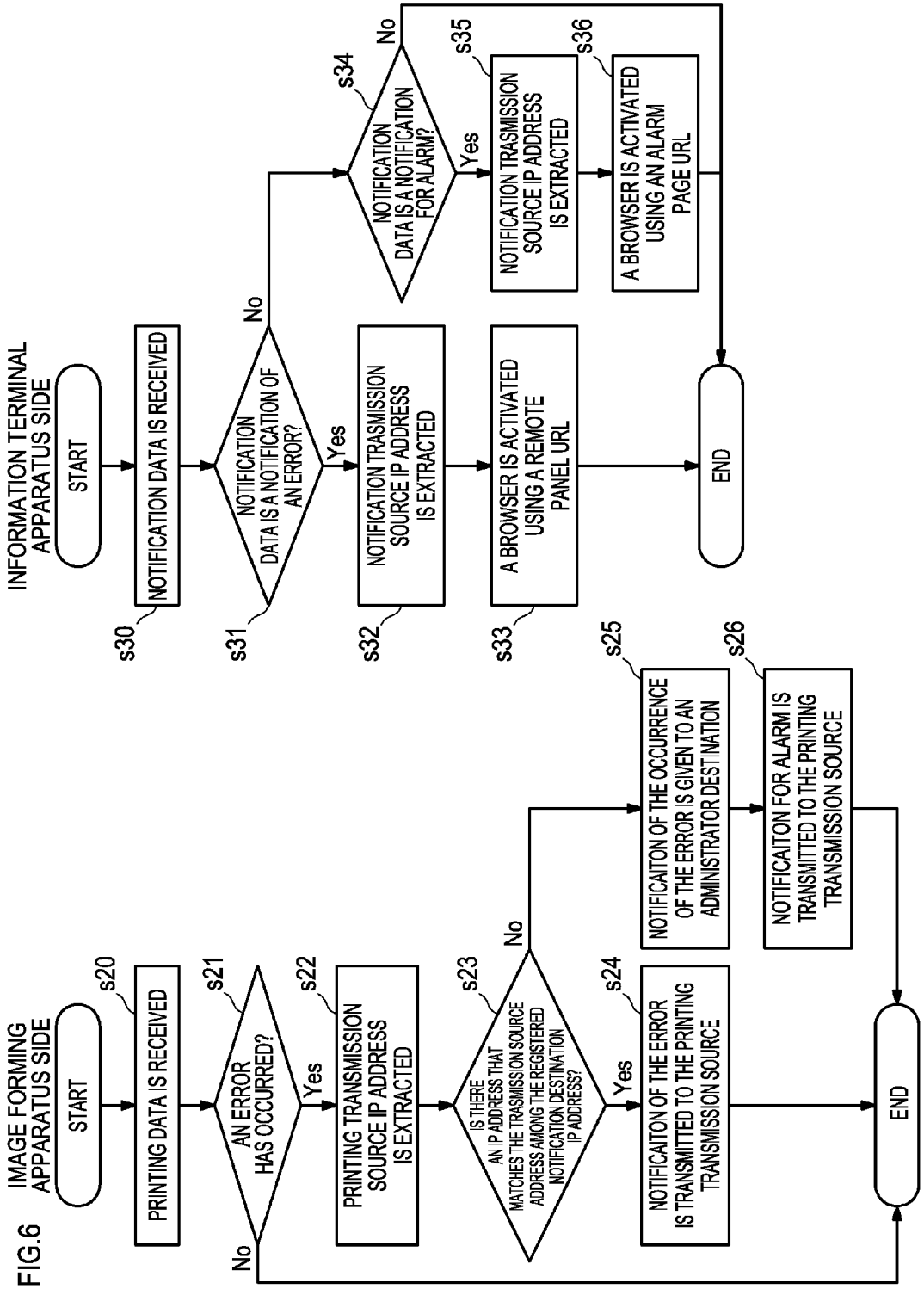
FIG. 6 is a flowchart illustrating an example of the processing procedure in the image forming apparatus management and control method in another embodiment of the present invention.

A procedure corresponding to the above-described aspect will be described based on the flowchart of FIG. 6.

A procedure at the image forming apparatus 1 side will be described.

Printing data is received (step s20), and it is judged whether an error has occurred (step s21).

If an error has not occurred (step s21, No), the processing is finished. If an error has occurred (step s21, Yes), a printing transmission source IP address that gives an event notification is extracted from the non-volatile memory 113, or the like (step s22).

It is judged whether there is an IP address that matches the transmission source address among the registered notification destination IP addresses (step s23). If there is an IP address that matches a transmission source address among the registered notification destination IP addresses (step s23, Yes), a notification of the error is transmitted to the printing transmission source through the network as a notification of the occurrence of the event (step s24).

If there is no IP address that matches the transmission source address among the registered notification destination IP addresses (step s23, No), a notification of the occurrence of the error is given to an administrator destination (step s25), a notification for alarm is transmitted to the printing transmission source (step s26), and the processing is finished.

Next, a procedure at the information terminal side will be described.

Notification data is received through the network (step s30), and it is judged whether or not the notification data is a notification of an error (step s31). If the notification data is a notification of an error (step s31, Yes), a notification transmission source IP address is extracted (step s32), and a browser is activated using a remote panel URL for the notification transmission source (step s33), and the processing is finished.

If the notification data is not a notification of an error (step s31, No), it is judged whether or not the notification data is a notification for alarm (step s34). If the notification data is not a notification for alarm (step s31, No), the processing is finished, while, if the notification data is a notification for alarm (step s34, Yes), the notification transmission source IP address is extracted (step s35), a browser is activated using an alarm page URL for the notification transmission source (step s36), and the processing is finished.

In the procedures of the above-described embodiment, a configuration is employed where, when a problem has occurred at the image forming apparatus 1, a notification is given to the information terminal apparatus 3 connected to the image forming apparatus 1 through the network, and the remote panel is activated at the information terminal apparatus 3 side. By adding information of several bytes to data for a notification on the network, it is possible to make the information terminal apparatus 3 activate application other than the remote panel. By this means, even if a problem which cannot be solved from the remote panel has occurred, the user can perform recovery through remote operation, so that it is possible to further reduce burden on the user. As an example, the image forming apparatus 1 transmits a notification of occurrence of JAM upon occurrence of JAM, and after receiving the notification, the information terminal apparatus 3 side activates a display page of data of camera inside equipment. The camera inside the equipment corresponds to the information acquiring unit, and data of the camera inside the equipment corresponds to information acquired at the information acquiring unit. The user can issue an appropriate JAM treatment instruction to an operator who operates the image forming apparatus from a distant location by viewing data of the camera inside the equipment.

Figure 7:
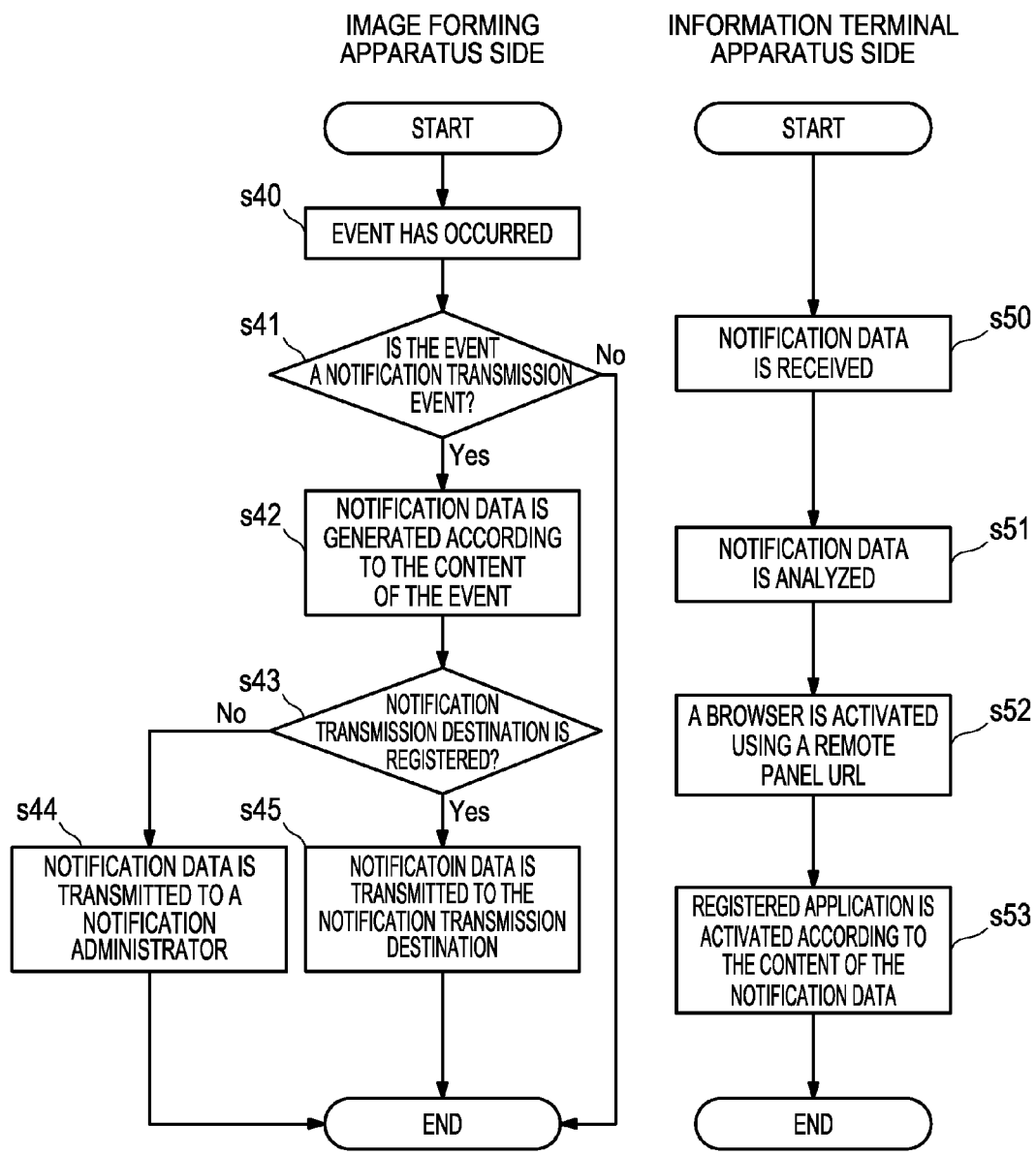
FIG. 7 is a flowchart illustrating still another example of the processing procedure in the image forming apparatus management and control method in another embodiment of the present invention.

The above-described procedure will be described based on the flowchart of FIG. 7.

A procedure at the image forming apparatus 1 side will be described.

An event has occurred (step s40), and it is judged whether the event is a notification transmission event (step s41).

If the event is not a notification transmission event (step s41, No), the processing is finished.

If the event is a notification transmission event (step s41, Yes), notification data is generated according to the content of the event (step s42), and it is judged whether a notification transmission destination is registered (step s43).

If the notification transmission destination is not registered (step s43, No), notification data is transmitted to a notification administrator (step s44), and the processing is finished.

If the notification transmission destination is registered (step s43, Yes), notification data is transmitted to the notification transmission destination (step s45), and the processing is finished.

Next, a procedure at the information terminal side will be described.

Notification data is received through the network (step s50), and the notification data is analyzed (step s51). A browser is activated using a remote panel URL for the notification transmission source (step s52), registered application is activated according to the content of the notification data (step s53), and the processing is finished. In this example, data acquired using the camera inside the equipment within the image forming apparatus 1 is displayed using the activated application. It is also possible to display information or perform operation using this application.

As described above, according to the present embodiment, when some problem has occurred at the image forming apparatus, by giving a notification to the information terminal apparatus connected to the image forming apparatus through the network, and activating the remote panel at the information terminal apparatus side, it is possible to promptly convey the content of the problem to the user, and solve the problem from a distant location if the problem is such a problem that can be solved on the operating unit, so that it is possible to reduce burden on the user. Further, because the remote panel does not have to be constantly connected to the image forming apparatus at the information terminal apparatus, and the notification data transmitted from the image forming apparatus to the information terminal apparatus can be made an extremely small size, it is possible to provide an advantage that the user can be promptly notified of occurrence of a problem without placing strain on network traffic.

While the present invention has been described above based on the above-described embodiment, the present invention can be modified as appropriate without deviating the scope of the present invention.

What is claimed is:

1. An image forming apparatus comprising:
an image forming unit that forms an image on a sheet based on image data;
an operation display unit for operation and display;
a communication unit that performs communication via a network; and
a control unit that manages and controls the image forming apparatus,
wherein, when a predetermined event has occurred at the image forming apparatus, the control unit issues a notification to an information terminal apparatus connected to the network, the notification being issued through the communication unit and being a notification for activating a remote panel by which the image forming apparatus is controllable,
wherein the predetermined event is an event from among a plurality of events including a paper out condition, a printing error, and a sheet size error.

2. The image forming apparatus according to claim 1, wherein, if the remote panel cannot be utilized at the information terminal apparatus, the control unit issues a notification for displaying an alarm to the information terminal apparatus.

3. The image forming apparatus according to claim 2, wherein the control unit provides information for displaying the alarm to the information terminal apparatus according to a request from the information terminal apparatus.

4. The image forming apparatus according to claim 1, wherein, if the remote panel cannot be utilized at the information terminal apparatus and the image forming apparatus is managed by a managing apparatus, the control unit issues a notification of occurrence of the event to the managing apparatus.

5. The image forming apparatus according to claim 1, wherein the control unit stores information of the information terminal apparatus, and if the event has occurred, issues a notification for activating the remote panel to the information terminal apparatus the information of which is stored in the control unit.

6. The image forming apparatus according to claim 1, further comprising:
an information acquiring unit that acquires information of the image forming apparatus,
wherein the control unit is configured to transmit the notification for activating the remote panel with the information acquired at the information acquiring unit being added to the notification.

7. The image forming apparatus according to claim 1, wherein the remote panel enables only remote display or enables remote operation and display for the image forming apparatus.

8. The image forming apparatus according to claim 1, wherein the control unit issues the notification to the information terminal apparatus which is a transmission source of the image data.

9. A non-transitory computer-readable recording medium storing an image forming apparatus control program for operating a control unit that controls an image forming apparatus, the program operating the control unit to perform functions comprising:
detecting whether a predetermined event has occurred at the image forming apparatus; and
when occurrence of the predetermined event is detected, issuing a notification to an information terminal apparatus connected to the image forming apparatus through a network, the notification being a notification for activating a remote panel by which the image forming apparatus is controllable,
wherein the predetermined event is an event from among a plurality of events including a paper out condition, a printing error, and a sheet size error.

10. The non-transitory computer-readable recording medium according to claim 9, wherein the program further operates the control unit to issue a notification for displaying an alarm to the information terminal apparatus, if the remote panel cannot be utilized at the information terminal apparatus.

11. The non-transitory computer-readable recording medium according to claim 10, wherein the program operates the control unit to provide information for displaying the alarm to the information terminal apparatus, in accordance with a request from the information terminal apparatus.

12. An image forming apparatus management and control method for managing and controlling an image forming apparatus, the method comprising:
judging whether a predetermined event has occurred at the image forming apparatus, and when it is judged that the predetermined event has occurred, issuing a notification to an information terminal apparatus connected to the image forming apparatus, the notification being a notification for activating a remote panel by which the image forming apparatus is controllable,
wherein the predetermined event is an event from among a plurality of events including a paper out condition, a printing error, and a sheet size error.

13. The image forming apparatus management and control method according to claim 12, wherein, if the remote panel cannot be utilized at the information terminal apparatus, a notification for displaying an alarm is issued to the information terminal apparatus.

14. The image forming apparatus management and control method according to claim 13, wherein information for displaying the alarm is provided to the information terminal apparatus according to a request from the information terminal apparatus.

15. The image forming apparatus management and control method according to claim 12, wherein, if the remote panel cannot be utilized at the information terminal apparatus, a notification of the event is issued to a managing apparatus that manages the image forming apparatus.

16. The image forming apparatus management and control method according to claim 12, wherein information of the information terminal apparatus is stored, and if the event has occurred, a notification for activating the remote panel is issued to the information terminal apparatus the information of which is stored.

17. The image forming apparatus management and control method according to claim 12, wherein the notification for activating the remote panel is issued with information acquired at an information acquiring unit that acquires information of the image forming apparatus being added to the notification.

* * * * *